United States Patent
Weinfield (10) Patent No.: US 9,147,294 B1
(45) Date of Patent: Sep. 29, 2015

(54) APPARATUS AND METHOD FOR INTELLIGENT CHANNEL SWITCHING TO SUPPORT V2X COMMUNICATION

(71) Applicants: DENSO International America, Inc., Southfield, MI (US); DENSO CORPORATION, Kariya, Aichi-pref. (JP)

(72) Inventor: Aaron Weinfield, Encinitas, CA (US)

(73) Assignees: DENSO International America, Inc., Southfield, MI (US); DENSO CORPORATION, Kariya-shi, Aichi-ken (JP)

( * ) Notice: Subject to any disclaimer, the term of this patent is extended or adjusted under 35 U.S.C. 154(b) by 12 days.

(21) Appl. No.: 14/291,482

(22) Filed: May 30, 2014

(51) Int. Cl.
*G08G 1/0965* (2006.01)
*G07C 5/00* (2006.01)
*H04L 29/08* (2006.01)
*H04W 72/04* (2009.01)
*G08G 1/0967* (2006.01)

(52) U.S. Cl.
CPC ............ *G07C 5/008* (2013.01); *H04L 67/12* (2013.01); *H04W 72/048* (2013.01); *G08G 1/096783* (2013.01); *G08G 1/096791* (2013.01)

(58) Field of Classification Search
CPC ..... G07C 5/008; H04W 72/048; H04L 67/12; G08G 1/0965; G08G 1/161; G08G 1/164; G08G 1/096783; G08G 1/096791
See application file for complete search history.

(56) References Cited

U.S. PATENT DOCUMENTS

| | | | |
|---|---|---|---|
| 7,418,346 B2* | 8/2008 | Breed et al. | 701/301 |
| 8,116,959 B2* | 2/2012 | Laberteaux et al. | 701/100 |
| 2011/0128902 A1* | 6/2011 | Guo | 370/312 |
| 2011/0255482 A1* | 10/2011 | Holland et al. | 370/329 |
| 2011/0280325 A1* | 11/2011 | Fernandez et al. | 375/260 |
| 2012/0149389 A1* | 6/2012 | Lin et al. | 455/456.1 |
| 2013/0012253 A1* | 1/2013 | Yamamoto | 455/509 |
| 2014/0051346 A1* | 2/2014 | Li et al. | 455/3.01 |

FOREIGN PATENT DOCUMENTS

JP  2009-48546  *  3/2009

OTHER PUBLICATIONS

Misic et al.; Tradeoff Issues for CCH/SCH Duty Cycle for IEEE 802.11p Single channel Devices; Global Telecommunications Conf. (Globecom 2010); IEEE; Dec. 6-10, 2010.*

(Continued)

*Primary Examiner* — Michael J Zanelli
(74) *Attorney, Agent, or Firm* — Harness, Dickey & Pierce, P.L.C.

(57) ABSTRACT

An onboard equipment disposed in a subject vehicle may communicate with one or more other vehicles and/or one or more stationary road side terminals. The onboard equipment may include a radio and a communication module. The radio may communicate with the other vehicles via a vehicle channel, and with the stationary roadside terminals via a control channel and a service channel. The communication module may control the radio in a first mode when the vehicle speed is greater than a threshold or in a second mode when the vehicle speed is less than the threshold. In the first mode, the communication module sets the radio to the vehicle channel. In the second mode, the communication module switches the radio between the control channel and the vehicle channel or between the service channel and the vehicle channel based on a predetermined condition.

19 Claims, 6 Drawing Sheets

(56) References Cited

OTHER PUBLICATIONS

Tsuboi et al.; Dual Receiver Communication System for DSRC; 2nd Conf. on Future Generation Communication and Networking, 2008; FGCN '08; vol. 1, pp. 459-464; Dec. 13-15, 2008.*

Long et al.; Vehicular Wireless Short-Range communication for Improving Instersection Safety; Communications Magazine; IEEE; vol. 11, pp. 104-110; Nov. 2009.*

The VII Consortium, "Vehicle Infrastructure Integration Proof of Concept, Technical Description—Vehicle", May 19, 2009.

* cited by examiner

APPARATUS AND METHOD FOR INTELLIGENT CHANNEL SWITCHING TO SUPPORT V2X COMMUNICATION

FIELD

The present disclosure relates to an apparatus and a method for supporting V2X communication. More particularly, the present disclosure relates to controlling a radio via an intelligent channel switching method to perform V2X communication.

BACKGROUND

This section provides background information related to the present disclosure which is not necessarily prior art. In recent years, protocols related to vehicle based safety systems have been established for vehicle-to-infrastructure (V2I) communication and vehicle-to-vehicle (V2V) communication. Such protocols, in essence, establish a wireless communication system which may be referred to as a V2X system. For example, IEEE 802.11p and IEEE 1609 are standards that relate to wireless access in vehicular environments (WAVE).

The V2X system allows the exchange of data such as critical safety and operational data between vehicles and other external devices, such as stationary roadside terminals. An on-board equipment (OBE) disposed within the vehicle may then analyze the data received based on a series of predetermined algorithms to determine, for example, a possible collision threat. Under the V2X system, vehicles and stationary roadside terminals are required to communicate using dedicated short range communication (DSRC).

For V2V communication, vehicles may periodically transmit a message on a dedicated channel, such as a vehicle safety channel (VSC). The message may include information related to a subject vehicle's speed, breaking data, travel direction, and other suitable vehicle information. Other vehicles, which receive the message, may use the information to detect a possible collision with a neighboring vehicle.

For V2I communication, vehicles may receive WAVE service advertisements (WSA) via another dedicated channel, such as a control channel (CCH). Such WSA can be transmitted by the stationary roadside terminals. The WSA may contain a list of services that are available in the vicinity of the vehicle. For example, the WSA may pertain to services related to security certificates which can be downloaded, vehicle probe data which can be uploaded, restaurants, and other suitable services. The vehicle may then acquire such service by switching to yet another dedicated channel, such as a service channel (SCH). Specifically, the WSA message received on the CCH provides information regarding a SCH channel number at which the vehicle may acquire the desired service.

Figure 8:
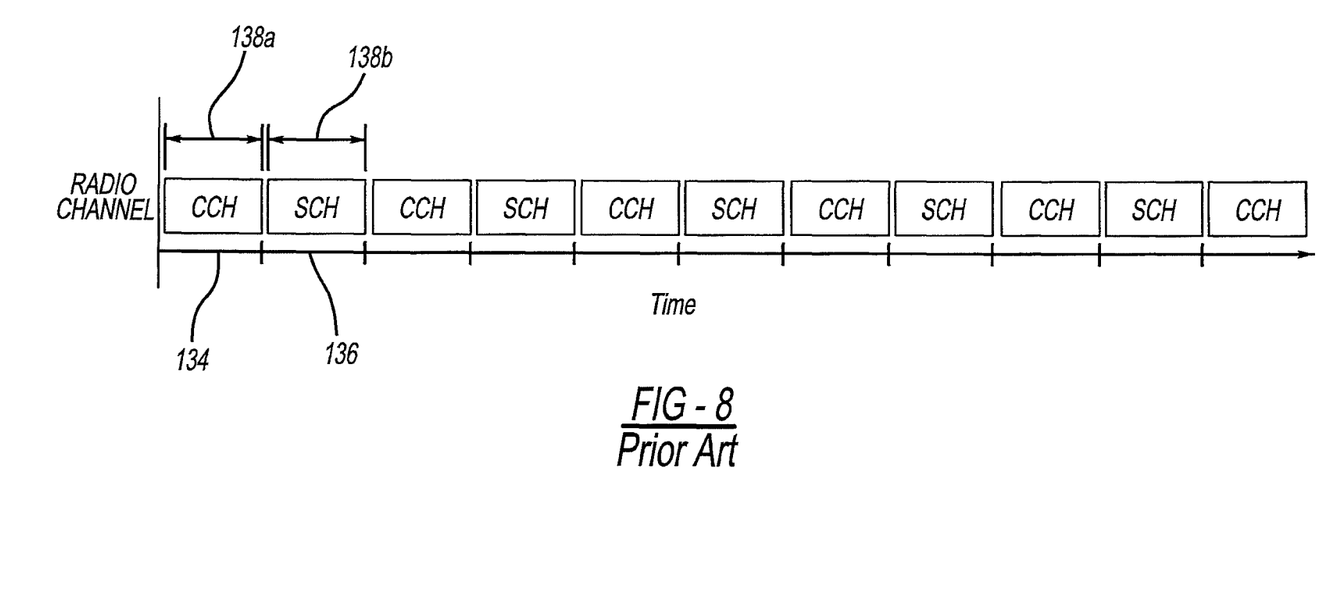
FIG. 8 illustrates an example setting of DSRC radio for vehicle to infrastructure communication.

Under V2I communication, as shown in FIG. 8, the vehicle switches to the CCH during a designated CCH interval 134 and the SCH during a designated SCH interval 136. Both the CCH interval 134 and the SCH interval 136 are for preset time periods 138a and 138b, respectively, which may be determined by industry protocol/standards.

The VSC, the CCH, and the SCH are three different radio channels. To perform both V2V communication and V2I communication, the vehicle may utilize two DSRC radios, where one DSRC radio is dedicated for V2V communication and the other DSRC radio is dedicated for V2I communication.

SUMMARY

This section provides a general summary of the disclosure, and is not a comprehensive disclosure of its full scope or all of its features.

The present disclosures provide for an onboard equipment disposed in a subject vehicle. The onboard equipment may communicate with one or more other vehicles and/or one or more stationary road side terminals. The onboard equipment may include a radio and a communication module.

The radio performs dual way communication with the other vehicles and the stationary roadside terminals located within a communication range of the subject vehicle. The radio may communicate with the other vehicles via a vehicle channel, and with the stationary roadside terminals via a control channel and a service channel. The control channel is operable during a first communication interval and the service channel is operable during a second communication interval. The radio may be configured to alternate between the first communication interval and the second communication interval.

The communication module may control the radio based on the vehicle speed of the subject vehicle. The communication module may control the radio in a first mode when the vehicle speed is greater than a preset threshold or in a second mode when the vehicle speed is less than the preset threshold. In the first mode, the communication module sets the radio to the vehicle channel. In the second mode, the communication module switches the radio between the control channel and the vehicle channel or between the service channel and the vehicle channel based on a predetermined condition.

In an aspect of the present disclosure, the communication module may set the radio to the control channel during the first communication interval and the vehicle channel during the second communication interval when in the second mode. After the predefined condition is met, the communication module may set the radio to the service channel during the second communication interval and the vehicle channel during the first communication interval when in the second mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
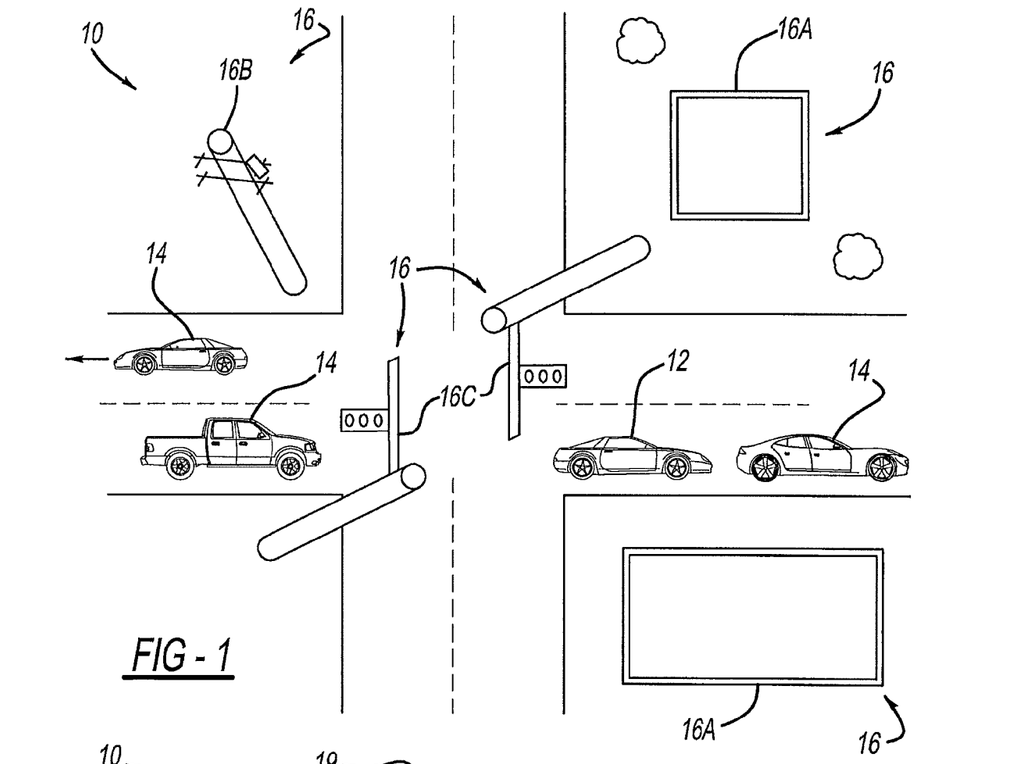
FIG. 1 illustrates an example of a V2X communication system between vehicles and stationary roadside terminals.
Figure 2:
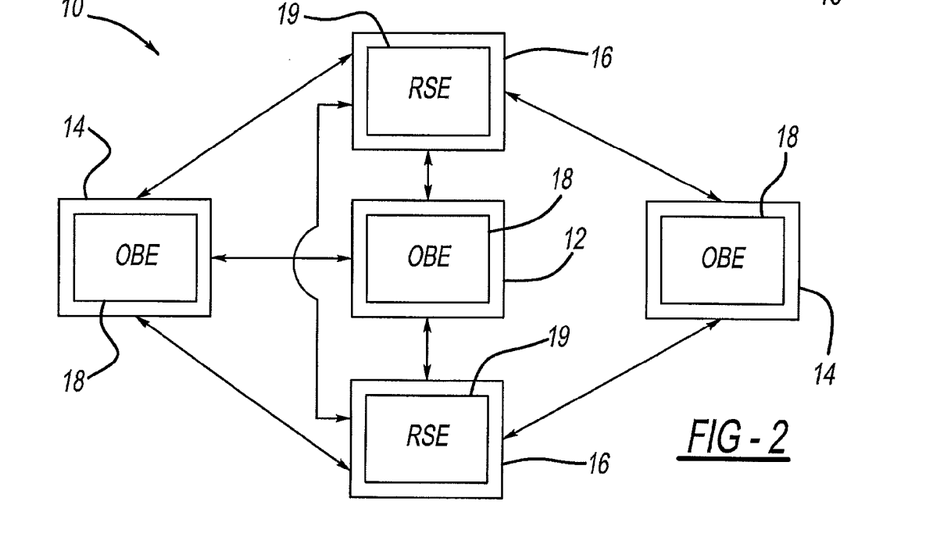
FIG. 2 is an example functional block diagram of the V2X communication system.

The present disclosure will now be described more fully with reference to the accompanying drawings. With reference to FIGS. 1 and 2, an example of a V2X communication system 10 is presented. The V2X communication system 10 is established between multiple vehicles and non-vehicles. Specifically, a subject vehicle 12 is in communication with one or more other vehicles 14 (i.e., vehicle-to-vehicle communication) and one or more stationary roadside terminals 16 (i.e., vehicle-to-infrastructure communication) in real time. The stationary roadside terminals 16 may include, for example, buildings 16A, antennas 16B, and/or traffic control devices 16C. Under the V2X communication network 10, the vehicles 12, 14 and the stationary roadside terminals 16 communicate using dedicated short range communication (DSRC) (e.g., 5.9 GHz wireless links).

To communicate via the V2X communication system 10, the vehicles 12, 14 may include an on-board equipment (OBE) 18, and the stationary roadside terminals 16 may include a roadside equipment (RSE) 19 (FIG. 2). The OBE 18 may be a separate stand-alone apparatus that is disposed in the vehicle 12, 14. Alternatively, the OBE 18 may be integrated with the vehicle 12, 14. For example, the OBE 18 may be communicable coupled to other vehicular modules disposed in the vehicle 12, 14 via a communication bus, such as CAN, LIN. The OBE 18 may also interface with a user interface disposed within the vehicle, such as an audio system and/or display of the vehicle 12, 14. The OBE 18 may also be referred to as an onboard communication apparatus.

Figure 3:
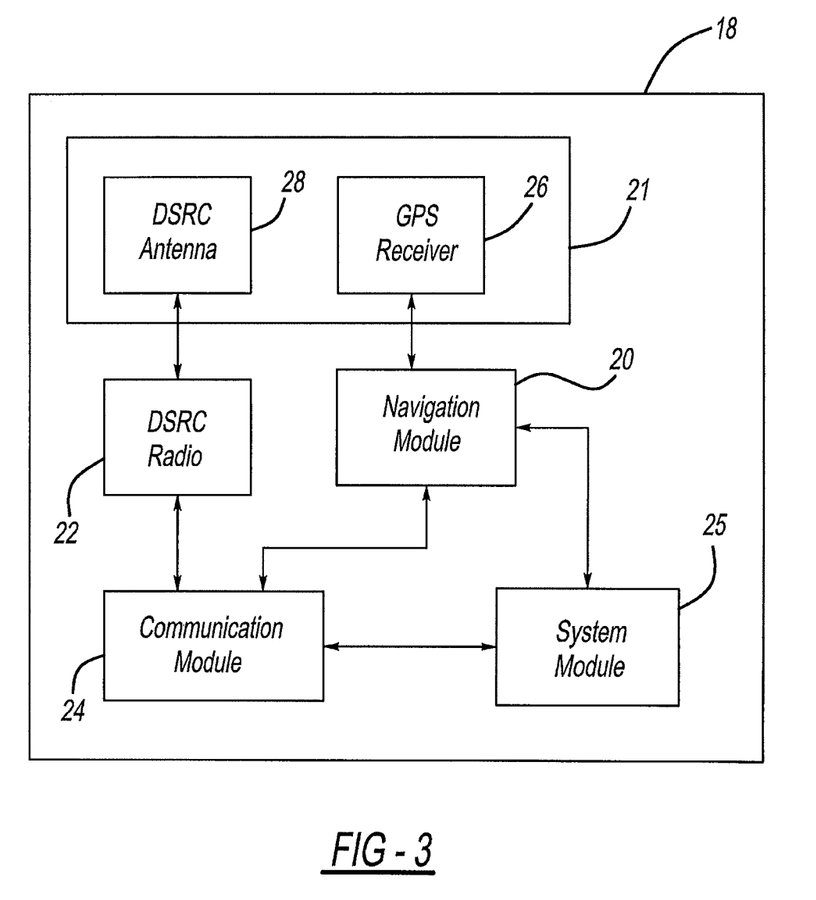
FIG. 3 is an example functional block diagram of an on-board equipment (OBE)

With reference to FIG. 3, an example block diagram of the OBE 18 is presented. The OBE 18 may include a navigation module 20, an antenna module 21, a DSRC radio 22, a communication module 24, and a system module 25. These modules may be physically distinct or some may be combined into the same physical entity. As used herein, the term module may refer to, be part of, or include an application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above. The term module may further include memory that stores code executed by the processor, where code, as used above, may include software, firmware, and/or microcode, and may refer to programs, routines, functions, classes, and/or objects.

The navigation module 20 is a global positioning system device that can monitor the position of the subject vehicle 12. More particularly, the navigation module 20 can monitor the position, the speed, the braking force, and other vehicle parameters of the subject vehicle 12. The navigation module 20 may receive the position of the vehicle 12 via a GPS receiver 26 which can be housed in the antenna module 21. The GPS receiver 26 may also provide a signal pulse at the top of every second, which can be used by the communication module 24 to monitor a time period and to synchronize the time of the OBE 18. Information gathered by the navigation module may be provided to the system module 25.

In addition to the GPS receiver 26, the antenna module 21 can include a DSRC antenna 28 for receiving and transmitting signals in the DSRC communication band. To communicate with other vehicles 14 and the stationary roadside terminals 16, the OBE 18 includes the DSRC radio 22 which is based on communication protocols. For example, the DSRC radio 22 may follow the communication protocols established under IEEE 802.11p and IEEE 1609 wireless access in vehicular environments (WAVE). Such protocols provide that the DSRC radio 22 establish communication with other vehicles 14 using a Vehicle Safety Channel (VSC) and with stationary roadside terminals 16 using a Control Channel (CCH) and a Service Channel (SCH). In the following description, a "V2V mode" will be used to refer to a communication mode between the subject vehicle 12 and other vehicles 14, and a "V2I-V2V mode" will be used to referred to a communication mode between the subject vehicle 12 and the stationary roadside terminals 16, and between the subject vehicle 12 and the other vehicles 14, as described herein.

Figure 4A:
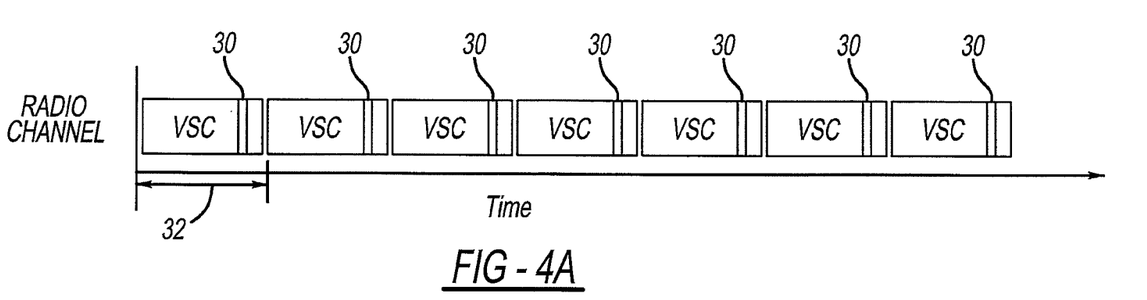
FIG. 4A illustrates an example setting of a dedicated short range communication (DSRC) radio of the OBE for a V2V mode.

The communication module 24 controls the DSRC radio 22. Specifically, for the V2V mode, the communication module 24 sets the DSRC radio 22 to the VSC. The communication module 24 periodically transmits vehicle information to other vehicles 14 and receives vehicle information from other vehicles 14. For example, in FIG. 4A, the DSRC radio 22 is set to the VSC and may transmit the safety information of the subject vehicle 12 during a timeslot 30 of a time period 32 via the DSRC antenna 28. The time period 32 may be determined by the manufacturer or can be based on industry protocol/standards. While FIG. 4A depicts that the timeslot 30 within which the vehicle information is transmitted occurs at the same interval within each time period 32, it is readily understood that the timeslot 30 may occur at different intervals within each time period. In addition, the communication module 24 may not transmit the vehicle information at each time period 32 as depicted. Alternatively, the communication module 24 may transmit the vehicle information at selected time periods.

During the time period 32, the OBE 18 of the subject vehicle 12 may receive vehicle information from other vehicles 14 via the DSRC antenna 28. The vehicle information exchanged between the vehicles 12, 14 may include the speed of the vehicle, breaking information, previous travel path of the vehicle, predicted travel path, a travel direction of the vehicle, and/or other suitable parameters regarding the current status of the vehicle. Such information can be used by the OBE 18 to detect potential collisions with other vehicles. For example, the system module 25 may generate the message which includes the vehicle information of the subject vehicle 12, and have the communication module 24 transmit the message via the DSRC radio 22. As the communication module 24 receives the vehicle information from other vehicles 14 via the DSRC radio 22, it provides the information to the system module 25. The system module 25 may then analyze the information received to determine, for example, whether the subject vehicle 12 is in danger of being in a collision with another vehicle 14. Such information may then be used by the subject vehicle 12 to prevent the collision or minimize the effects of the collision.

Figure 4B:
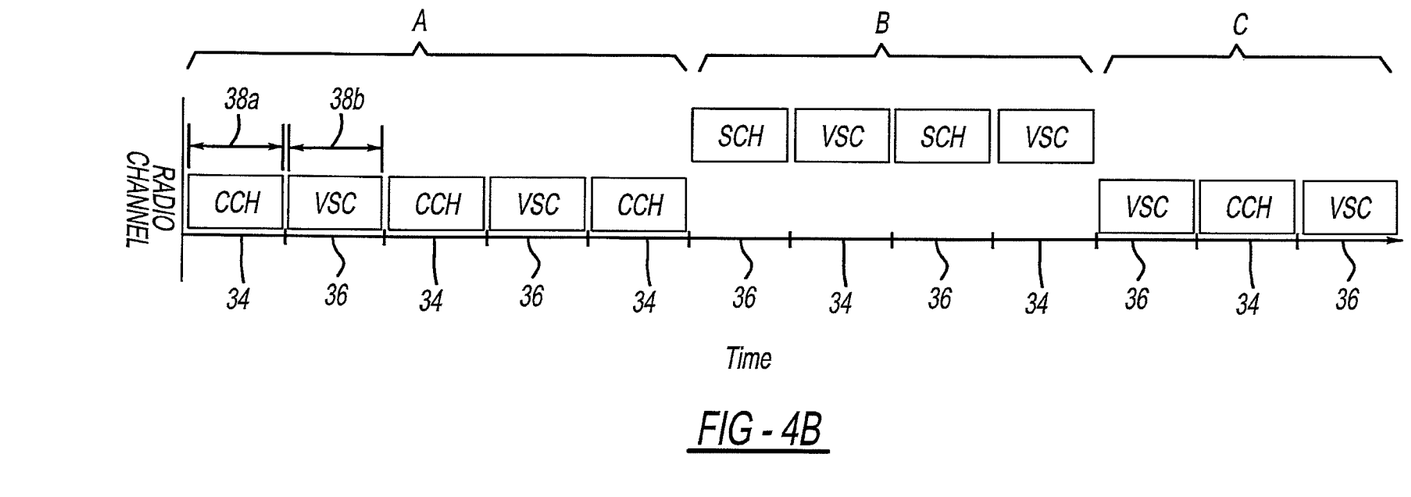
FIG. 4B illustrates an example setting of the DSRC radio of the OBE for a V2I-V2V mode.

For V2I-V2V mode, the communication module 24 performs an intelligent switching control of the DSRC radio 22 in which the communication module 24 may either switch between the CCH and the VSC or between SCH and the VSC. More particularly, with reference to FIG. 4B, the communication module 24 may switch between the CCH and the VSC by having the DSRC radio 22 set to the CCH during a designated CCH interval 34 and to the VSC during a designated SCH interval 36 (portion "A" in FIG. 4B). The CCH interval 34 and the SCH interval 36 are set for fixed time periods 38*a* and 38*b*, respectively, which can be based on industry protocol/standards. The fixed time period 38*a* for the CCH interval 34 may be of the same duration or different duration than the fixed time period 38*b* for the SCH interval 36.

During the CCH interval 34, the OBE 18 may receive WAVE service advertisements (WSA) from the RSE 19 of the stationary roadside terminal 16. The WSA may contain a list of services available during the designated SCH interval. The WSA may include a SCH channel number and an identifier for the service provider. The WSA may include, for example, services related to security certificates which can be downloaded, vehicle probe data to be uploaded, restaurants, and other suitable services which can be provided by the stationary roadside terminal 16. Under protocols established by the industry (e.g., IEEE 1609) the RSE 19 issues the WSA during the designated CCH interval, and provides the service during the designated SCH interval. The communication module 24 provides the received WSA to the system module 25. When the system module 25 detects a desired WSA, the communication module 24 switches between SCH and VSC. Specifically, the communication module 24 sets the DSRC radio 22 to the SCH during the SCH interval 36 and the VSC during the CCH interval 34 (portion "B" in FIG. 4B). The system module 25 may then perform the necessary operations to perform the service. Once the service transaction is complete, the communication module 24 switches between the CCH and the VSC by having the DSRC radio 22 set to the CCH during the CCH interval 34 and to the VSC during the SCH interval 36 (portion "C" in FIG. 4B).

When the DSRC radio 22 is set to the VSC during the CCH or the SCH intervals, the communication module 24 may periodically exchange vehicle information with other vehicles 14. The vehicle information transmitted during the V2I-V2V mode may be exchanged at a rate and/or timeslot different than during the V2V mode. For example, during V2V mode, the frequency at which the vehicle information is transmitted may be 10 Hz, whereas during V2I-V2V mode it may be 1 Hz.

The communication module 24 may include a timer, which is used to monitor the CCH interval 34 and the SCH interval 36. For instance, the communication module 24 may receive a signal from the GPS receiver 26 at the top of every second. Such signal may trigger the timer which can be based on the fixed time period 38*a*, 38*b*. It is understood that the communication module 24 may utilize other suitable methods for tracking the passage of the CCH interval 34 and the SCH interval 36.

The communication module 24 may switch between the V2V mode and the V2I-V2V mode based on the speed of the subject vehicle 12. For example, when the subject vehicle 12 is traveling at a speed (Vsp) greater than or equal to a vehicular speed threshold (Vth), the communication module 24 controls the DSRC radio 22 in the V2V mode (i.e., performs V2V communication). When the speed of the subject vehicle 12 is less than the vehicular speed threshold, the communication module 24 controls the DSRC radio 22 in the V2I-V2V mode (i.e., performs a combination of V2I and V2V communication). The communication module 24 may receive the speed of the subject vehicle 12 from the navigation module 20. Alternatively, the communication module 24 may receive the speed from a module or sensor which is part of the vehicle system and is external of the OBE 18 via the vehicle network.

The vehicular speed threshold is a predefined or a preset value in which it is less likely that the subject vehicle 12 would be the cause of an accident. For example, when the vehicle is at a stop light or driving at a slow speed in traffic, such as a speed less than 20 mph, the subject vehicle 12 is less likely to cause an accident. Thus, it may not be necessary for the DSRC radio 22 to continuously perform V2V communication. Once the subject vehicle 12 begins to travel above the vehicular speed threshold, the communication module 24 switches from the V2I-V2V mode to the V2V mode regardless if the OBE 18 was in the midst of acquiring a service in the SCH interval 36.

During the V2I-V2V mode, the communication module 24 may switch to the V2V mode when the OBE 18 does not receive a WSA within a preset time period (e.g., 30 seconds, or two minutes). In other words, the communication module 24 may timeout from V2I and V2V communication even when the speed of the vehicle is less than the vehicular speed threshold. In addition, if the subject vehicle 12 continues to travel below the vehicular speed threshold, the communication module 24 may switch back to the V2I-V2V mode.

Figure 5:
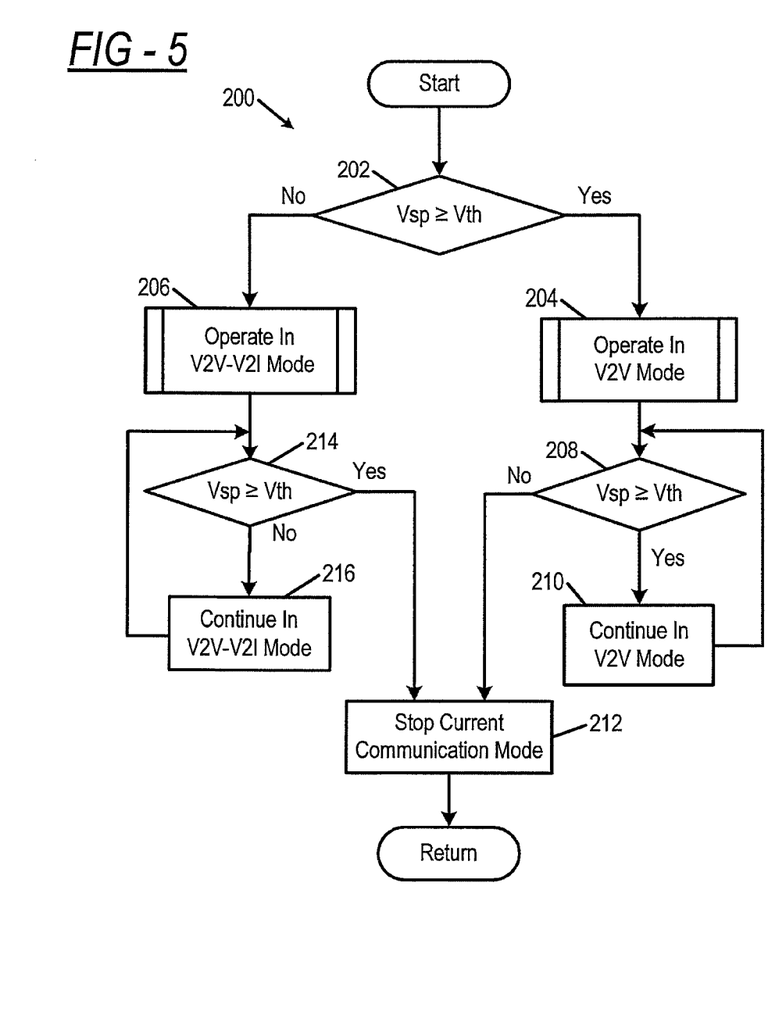
FIG. 5 is a flowchart of an example method for switching between the V2V mode and the V2I-V2V mode.

Referring now to FIG. 5, an example method 200 of switching between the V2V mode and the V2I-V2V mode is presented. At 202 the OBE 18 determines whether the subject vehicle 12 having the OBE 18 is traveling at a speed (Vsp) greater than or equal to the vehicular speed threshold (Vth). If true, the OBE 18 performs in the V2V mode at 204. If false, the OBE 18 performs in the V2I-V2V mode at 206.

From 204, the OBE 18 determines whether the subject vehicle 12 is traveling at a speed (Vsp) greater than or equal to the vehicular speed threshold (Vth) at 208. If true, the OBE 18 continues to perform in the V2V mode at 210 and returns to 208. If false, the OBE 18 stops the communication mode at 212 and returns to 202.

From 206, the OBE 18 determines whether the subject vehicle is traveling at a speed (Vsp) greater than or equal to the vehicular speed threshold (Vth) at 214. If true, the OBE 18 stops the communication mode at 212 and returns to 202. If false, the OBE 18 continues to perform in the V2I-V2V mode at 216 and returns to 214.

At 208 and 214, the OBE 18 monitors the speed of the subject vehicle 12 to determine whether the current communication mode (i.e., V2V mode or V2I-V2V mode) should be continued or if the communication mode should be switched to the other mode. Thus, the OBE 18 continues to control the communication mode of the DSRC radio 22 based on the speed of the vehicle.

Figure 6:
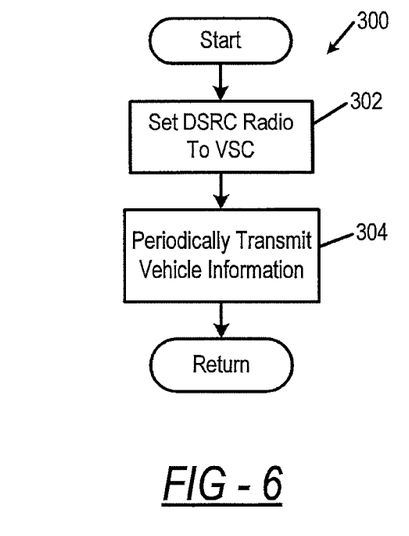
FIG. 6 is a flowchart of an example method for performing the V2V mode.

Referring now to FIG. 6, an example method 300 of the V2V mode is presented. At 204 of the method 200, the OBE 18 initiates the V2V mode. The OBE 18 may perform the method 300 and continue to perform the remaining steps of method 200 simultaneously. At 302 the OBE 18 sets the DSRC radio 22 to the VSC. At 304, the OBE 18 periodically transmits the vehicle information. The OBE 18 may also receive vehicle information from other vehicles 14 in the V2V mode. The OBE 18 remains in the V2V mode and periodically transmits the vehicle information until the speed of the vehicle falls below the vehicular speed threshold.

Figure 7:
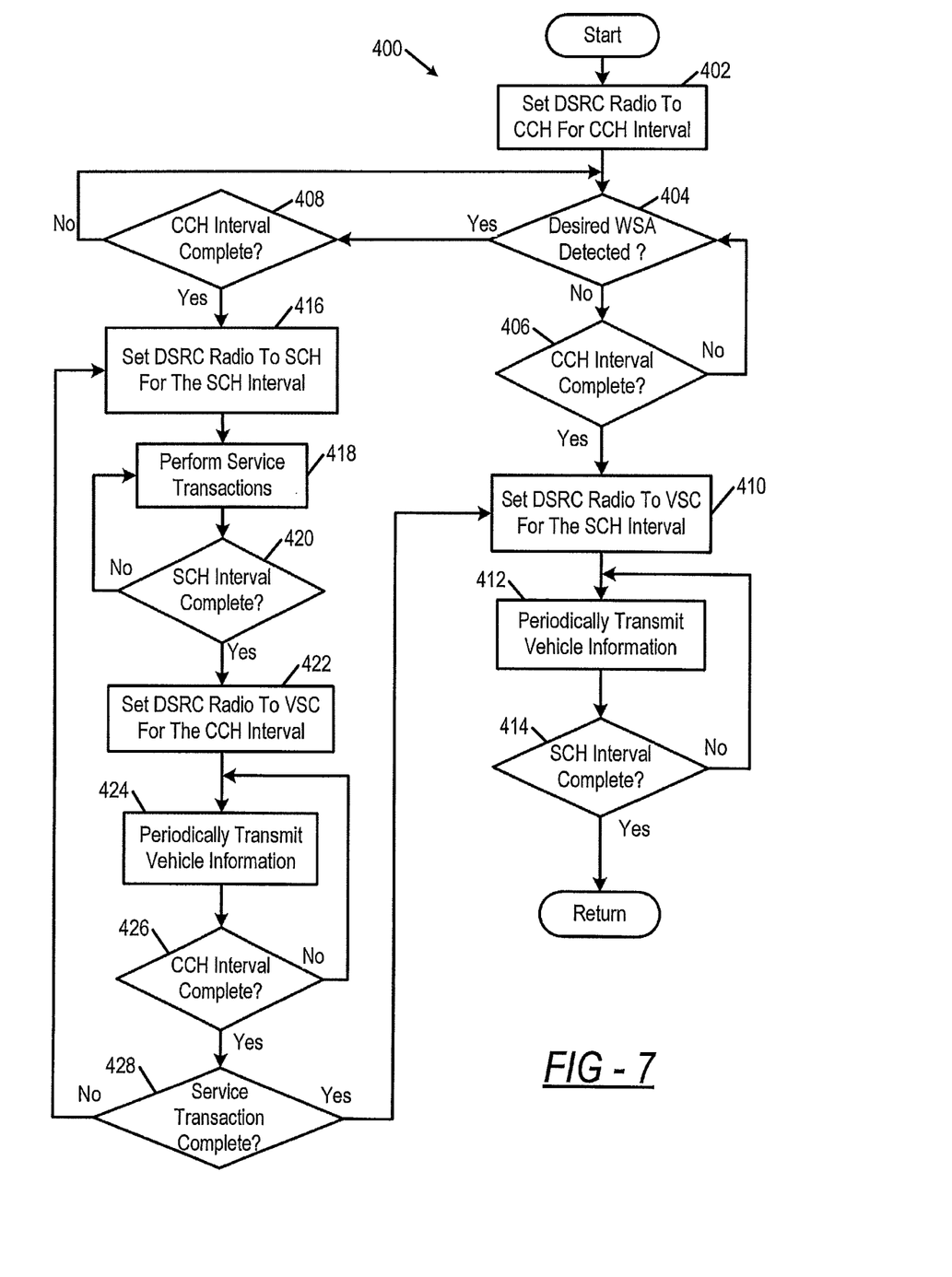
FIG. 7 is a flowchart of an example method for performing the V2I-V2V mode.

Referring now to FIG. 7, an example method 400 of the V2I-V2V mode is presented. At 206 of the method 200, the OBE 18 initiates the V2I-V2V mode. The OBE 18 may perform the method 400 and continue to perform the remaining steps of method 200 simultaneously. Thus, the OBE 18 continues to perform the method 400 until the speed of the vehicle 12 goes above the vehicular speed threshold.

At 402, the OBE 18 sets the DSRC radio to the CCH in the CCH interval. At 404, the OBE 18 determines whether a desired WSA is detected. For example, the OBE 18 may determine whether a WSA is detected and whether the WSA contains a service that is of interest to the OBE 18. If true, the OBE 18 continues to 408. If false, the OBE 18 continues to 406.

At 406, the OBE 18 determines whether the CCH interval 34 is complete. If false, the OBE 18 returns to 404. If true, the OBE 18 sets the DSRC radio 22 to the VSC in the SCH interval 36 at 410. At 412, the OBE 18 periodically transmits the vehicle information of the subject vehicle 12. The OBE 18 may also receive the vehicle information of other vehicles 14. At 414, the OBE 18 determines whether the SCH interval 36 is complete. If false, the OBE 18 returns to 412. If true, the OBE 18 returns to 402.

At 408, the OBE 18 determines whether the CCH interval 34 is complete. If false, the OBE 18 returns to 404. If true, the OBE 18 sets the DSRC radio 22 to the SCH in the SCH interval 36 at 416. At 418, the OBE 18 performs the service transaction required for a desired WSA, which was detected at 404. At 420, the OBE 18 determines whether the SCH interval 36 is complete. If false, the OBE 18 returns to 418 and continues to perform the service transaction. If true, the OBE 18 sets the DSRC radio 22 to VSC during the CCH interval 34 at 422.

At 424, the OBE 18 periodically transmits the vehicle information of the subject vehicle 12. The OBE 18 may also receive the vehicle information of other vehicles 14. At 426, the OBE 18 determines whether the CCH interval 34 is complete. If false, the OBE 18 returns to 424. If true, the OBE 18 continues to 428.

At 428, the OBE 18 determines whether the service transaction is complete. For example, if one or more service transactions were initiated at 418, there is a chance that the service transactions were not completed before the completion of the SCH interval. Accordingly, if false, the OBE 18 returns to 416 to set the DSRC radio 22 to the SCH at the SCH interval. If true, the OBE 18 continues to 410 to set the DSRC to the VSC at the SCH interval.

At 412 and 424, the OBE 18 periodically transmits vehicle information at some minimal rate to ensure that the subject vehicle 12 is transmitting its information. The rate at which the vehicle information is being transmitted at 412 and 424 may be different from the transmission rate during the V2V mode. For example, the transmission rate at 412 and 424 may be less than the transmission rate at 304 of FIG. 6.

By performing the intelligent switching control of the DSRC radio 22 as described herein, the OBE 18 performs both V2V communication and V2I communication via a single DSRC radio. The OBE 18 allows the subject vehicle 12 to take advantage of the V2X system by performing V2V communication during high traveling speed, and performing both V2I and V2V communication during low traveling speed in which the safety risks of the vehicle is low. Accordingly, the cost of the OBE is minimized without impacting the critical communication requirements of the V2X system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

Although the terms first, second, third, etc. may be used herein to describe various elements, components, and/or sections, these elements, components, and/or sections should not be limited by these terms. These terms may be only used to distinguish one element, component, or section from another section. Terms such as "first," "second," and other numerical terms when used herein do not imply a sequence or order unless clearly indicated by the context. Thus, a first element, component, or section discussed below could be termed a second element, component, or section without departing from the teachings of the example embodiments.

What is claimed is:

1. An onboard communication apparatus disposed in a subject vehicle communicating with other vehicles and non-vehicles, the apparatus comprising:
   a navigation module monitoring a vehicle speed of the subject vehicle;
   a radio performing dual way communication with the other vehicles and the non-vehicles, wherein the radio communicates with the other vehicles via a first channel, and with the non-vehicles via a second channel; and
   a communication module controlling the radio based on the vehicle speed monitored by the navigation module, wherein
   the communication module controls the radio in a first mode to perform communication via the first channel when the vehicle speed is greater than or equal to a vehicular speed threshold, and
   the communication module controls the radio in a second mode to perform communication via the first channel and the second channel when the vehicle speed is less than the vehicular speed threshold, and, in the second mode, the communication module switches the radio between the first channel and the second channel at a preset interval.

2. The onboard communication apparatus of claim 1 wherein
   the radio further communicates with the non-vehicle devices via a third channel, and
   the communication module sets the radio to a third mode when a predetermined condition is met in the second mode, and in the third mode, the radio switches between the first channel and the third channel when the vehicle speed is less than the vehicular speed threshold and the predetermined condition is met.

3. The onboard communication apparatus of claim 1 wherein the communication module periodically transmits a vehicle operation message when the radio set to the first channel.

4. The onboard communication apparatus of claim 1 wherein the communication module is configured to receive an advertisement of an available service when the radio is set to the second channel.

5. The onboard communication apparatus of claim 1 wherein
the radio further communicates with the non-vehicle devices via a third channel,
the communication module periodically transmits a vehicle operation message when the radio is set to the first channel,
the communication module is configured to receive an advertisement of an available service when the radio is set to the second channel,
the communication module performs a service transaction for a given available service when the radio is set to the third channel, and
in response to receiving the advertisement of the given available service in the second mode, the communication module sets the radio to a third mode in which the radio switches between the third channel and the first channel at the preset interval to acquire the given available service.

6. The onboard communication apparatus of claim 1 wherein the radio performs dedicated short range communication.

7. The onboard communication apparatus of claim 1 wherein, in the first mode, the communication module periodically transmits a vehicle operation message via the radio which is set to the first channel, the vehicle operation message includes information related to driving operations of the subject vehicle.

8. An onboard equipment disposed in a subject vehicle communicating with other vehicles and stationary roadside terminals, the onboard equipment comprising:
a speed detector monitoring a vehicle speed of the subject vehicle;
a radio performing dual way communication with the other vehicles and the stationary roadside terminals located within a communication range of the subject vehicle, wherein the radio communicates with the other vehicles via a vehicle channel, and with the stationary roadside terminals via a control channel and a service channel, the control channel is operable during a first communication interval, the service channel is operable during a second communication interval, the radio is configured to alternate between the first communication interval and the second communication interval; and
a communication module controlling the radio based on the vehicle speed detected by the speed detector, wherein the communication module controls the radio in a first mode or in a second mode,
in the first mode, the communication module sets the radio to the vehicle channel, the radio is in the first mode when the vehicle speed is greater than or equal to a preset threshold, and
in the second mode, the communication module switches the radio between the control channel and the vehicle channel or between the service channel and the vehicle channel based on a predetermined condition, the radio is in the second mode when the vehicle speed is less than the preset threshold.

9. The onboard equipment of claim 8 wherein
in the second mode, the communication module sets the radio to the control channel during the first communication interval and the vehicle channel during the second communication interval, and
after the predetermined condition is met, the communication module sets the radio to the service channel during the second communication interval and the vehicle channel during the first communication interval.

10. The onboard equipment of claim 8 wherein
the communication module periodically transmits a vehicle operation message when the radio is set to the vehicle channel,
the communication module is configured to receive an advertisement of a service when the radio is set to the control channel,
the communication module performs a service transaction for a given service when the radio is set to the service channel,
in the second mode, the communication module switches the radio between the control channel and the vehicle channel to receive the advertisement of the service,
in the second mode, the communication module determines whether an advertisement of the given service is received as the predetermined condition, and
in the second mode, the communication module switches the radio between the service channel and the vehicle channel to perform the service transaction for the given service when the advertisement of the given service is received.

11. The onboard equipment of claim 10 wherein, in the second mode, the communication module:
sets the radio to the control channel during the first communication interval and the vehicle channel during the second communication interval, and
after the predetermined condition is met, the communication module sets the radio to the service channel during the second communication interval and the vehicle channel during the first communication interval.

12. The onboard equipment of claim 10 wherein
in the second mode, the communication module sets the radio to switch between the control channel and the vehicle channel when the service transaction for the given service is complete via the service channel.

13. The onboard equipment of claim 8 wherein the radio performs dedicated short range communication.

14. A method for performing vehicle to vehicle communication and vehicle to infrastructure communication by a subject vehicle having an onboard equipment, the method comprising:
monitoring, by a speed detector, a vehicle speed of the subject vehicle;
controlling, by the onboard equipment, a radio in a first mode when the vehicle speed is equal to or greater than a vehicular speed threshold, wherein, in the first mode, the radio is set to a vehicle channel to communicate with one or more other vehicles, and the radio is disposed in the subject vehicle;
controlling, by the onboard equipment, the radio in a second mode when the vehicle speed is less than the vehicular speed threshold for communicating with the vehicles or one or more stationary roadside terminals, wherein, in the second mode, the onboard equipment switches the radio between a control channel and the vehicle channel or between a service channel and the vehicle channel based on a predefined condition;

in the second mode, setting the radio to the control channel during a first communication interval and the vehicle channel during a second communication interval, wherein the radio is configured to alternate between the first communication interval and the second communication interval; and in the second mode and after the predefined condition is met, setting the radio to the service channel during the second communication interval and the vehicle channel during the first communication interval.

15. The method of claim 14 further comprising:

in the second mode, switching, by the onboard equipment, the radio between the control channel and the vehicle channel for receiving an advertisement of an available service via the control channel;

in the second mode, determining, by the onboard equipment, whether an advertisement of a given available service has been received when the radio is set to the control channel as the predefined condition; and in the second mode, switching, by the onboard equipment, the radio between the service channel and the vehicle channel to perform a service transaction for the given available service when the advertisement of the given available service is received.

16. The method of claim 14 further comprising:

periodically transmitting, by the onboard equipment, a vehicle operation message when the radio is set to the vehicle channel;

receiving, by the onboard equipment, an advertisement of an available service when the radio is set to the control channel;

performing, by the onboard equipment, a service transaction for a given available service when the radio is set to the service channel;

in the second mode, switching, by the onboard equipment, the radio between the control channel and the vehicle channel for receiving the advertisement of the available service via the control channel;

in the second mode, determining, by the onboard equipment, whether the advertisement of the given available service has been received via the control channel as the predefined condition; and in the second mode, switching, by the onboard equipment, the radio between the service channel and the vehicle channel to perform the service transaction for the given available service when the advertisement of the given available service is received via the control channel.

17. The method of claim 16 further comprising:

in the second mode, switching, by the onboard equipment, between the control channel and the vehicle channel when the service transaction for the given available service via the service channel is complete.

18. The method of claim 14 wherein the radio performs dedicated short range communication.

19. The method of claim 14 further comprising:

in the first mode, periodically transmitting, by the onboard equipment, a vehicle operation message when the radio is set to the vehicle channel, wherein the vehicle operation message includes information regarding driving operations of the subject vehicle.

* * * * *